US 6,640,483 B2

(12) United States Patent
Nelson

(10) Patent No.: US 6,640,483 B2
(45) Date of Patent: Nov. 4, 2003

(54) LIGHTWEIGHT BIRD DECOY APPARATUS

(76) Inventor: Andrew L. Nelson, 214 N. Palmatory St., Horicon, WI (US) 53032

( * ) Notice: Subject to any disclaimer, the term of this patent is extended or adjusted under 35 U.S.C. 154(b) by 0 days.

(21) Appl. No.: 09/849,186

(22) Filed: May 4, 2001

(65) Prior Publication Data

US 2002/0095847 A1 Jul. 25, 2002

Related U.S. Application Data

(63) Continuation of application No. 29/138,206, filed on Jan. 2, 2001.
(60) Provisional application No. 60/263,451, filed on Jan. 24, 2001.

(51) Int. Cl.[7] .............................................. A01M 31/06
(52) U.S. Cl. .................................................. 43/3; 43/2
(58) Field of Search .......................... 43/3, 2; D22/125; 244/153 R, 154; 116/173; 40/218

(56) References Cited

U.S. PATENT DOCUMENTS

| | | | | |
|---|---|---|---|---|
| 743,301 A | * | 11/1903 | Lischtiak | 244/153 R |
| 810,690 A | | 1/1906 | Weiss | 43/3 |
| 984,295 A | * | 2/1911 | Peuvot | 244/154 |
| 1,083,882 A | | 1/1914 | Hindmarsh | 43/3 |
| 1,428,216 A | * | 9/1922 | Chase | 43/3 |
| 1,629,442 A | | 5/1927 | Geisinger | 43/3 |
| 2,028,849 A | | 1/1936 | Shay | 43/3 |
| 2,129,781 A | | 9/1938 | Park | 43/3 |
| 2,434,077 A | * | 1/1948 | Lang | 244/153 R |
| 2,441,753 A | * | 5/1948 | Carpenter | 43/3 |
| 2,442,417 A | * | 6/1948 | Lang | 244/153 R |
| 2,507,777 A | * | 5/1950 | Frey | 244/153 R |
| 2,688,303 A | * | 9/1954 | Leander | 116/173 |
| 2,751,172 A | * | 6/1956 | Rogallo et al. | 244/153 R |
| 3,110,460 A | * | 11/1963 | Koonce et al. | 244/153 R |
| 3,116,902 A | * | 1/1964 | Gould | 244/153 R |
| 3,250,500 A | * | 5/1966 | Hall | 244/153 R |
| 3,273,273 A | * | 9/1966 | McLarty | 116/173 |
| 3,358,399 A | * | 12/1967 | Waldmann | 244/153 R |
| 3,436,856 A | | 4/1969 | Miller | 43/3 |
| 3,476,929 A | * | 11/1969 | Klinger | 116/173 |
| 3,570,790 A | * | 3/1971 | Christoffel et al. | 244/153 R |
| 3,570,792 A | * | 3/1971 | Christoffel et al. | 244/153 R |
| 3,687,402 A | * | 8/1972 | Christoffel et al. | 244/153 R |
| 4,221,351 A | * | 9/1980 | Holland, Jr. | 244/153 R |
| 4,228,977 A | | 10/1980 | Tanaka | 43/2 |
| 4,318,240 A | | 3/1982 | Hillesland | 43/3 |
| 4,875,431 A | * | 10/1989 | Dobosz | 116/173 |
| 4,910,905 A | * | 3/1990 | Girdley et al. | 43/3 |
| 4,911,384 A | | 3/1990 | Stankus | 244/153 R |
| 5,003,722 A | | 4/1991 | Berkley et al. | 43/3 |
| 5,191,730 A | | 3/1993 | Balmer | 43/3 |
| D339,402 S | | 9/1993 | Santos, Jr. | D22/125 |
| 5,246,517 A | * | 9/1993 | Watson | 116/173 |
| 5,377,611 A | * | 1/1995 | Crookham et al. | 116/173 |
| 5,423,281 A | * | 6/1995 | Crookham et al. | 116/173 |
| 5,595,012 A | | 1/1997 | Coleman | 43/3 |
| 5,678,346 A | | 10/1997 | Kellett | 43/2 |
| 5,832,649 A | * | 11/1998 | Kilgore | 43/2 |
| D407,346 S | * | 3/1999 | Wyatt et al. | D11/168 |
| 6,044,581 A | | 4/2000 | Shipman et al. | 43/3 |
| 6,095,458 A | | 8/2000 | Cripe | 244/153 R |
| 6,213,048 B1 | * | 4/2001 | Chang | 116/173 |
| 6,311,425 B1 | * | 11/2001 | Capps | 43/3 |
| 6,374,529 B1 | * | 4/2002 | Petroski et al. | 43/3 |
| 6,381,896 B1 | * | 5/2002 | Coker | 43/3 |
| 6,390,017 B1 | * | 5/2002 | Hendrickson et al. | 116/173 |
| D464,104 S | * | 10/2002 | Welu | D22/125 |

* cited by examiner

Primary Examiner—Darren W. Ark
(74) Attorney, Agent, or Firm—Kenyon & Kenyon

(57) ABSTRACT

A bird decoy apparatus that includes a plurality of flat decoy panels, each panel being shaped to simulate an appearance of a bird. Each of the plurality of decoy panels are attached to a suspension line.

1 Claim, 2 Drawing Sheets

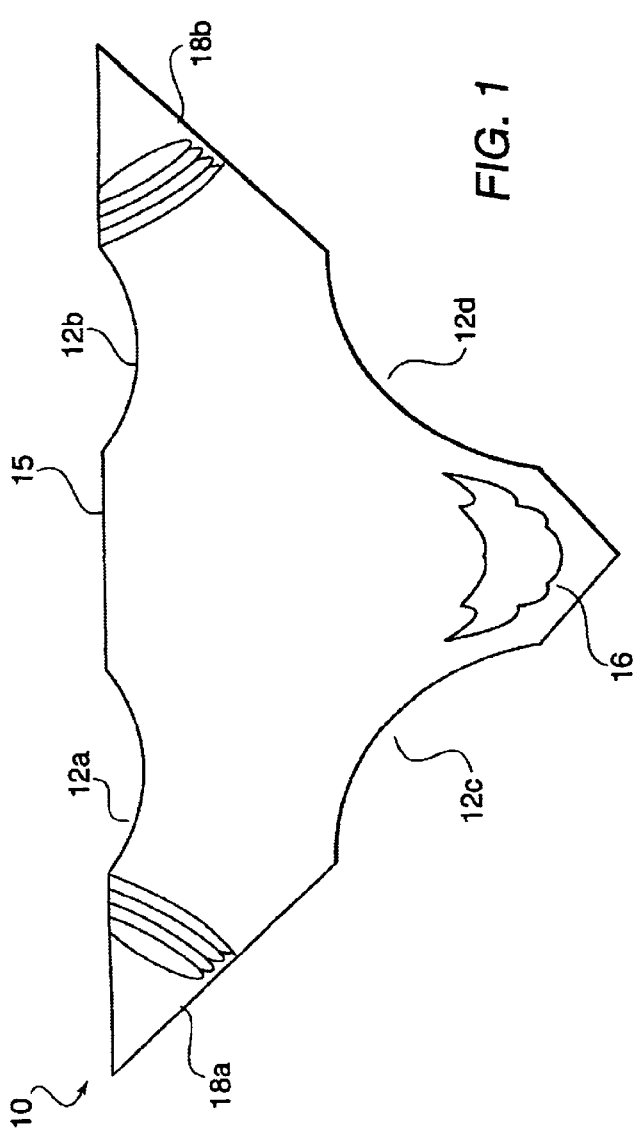
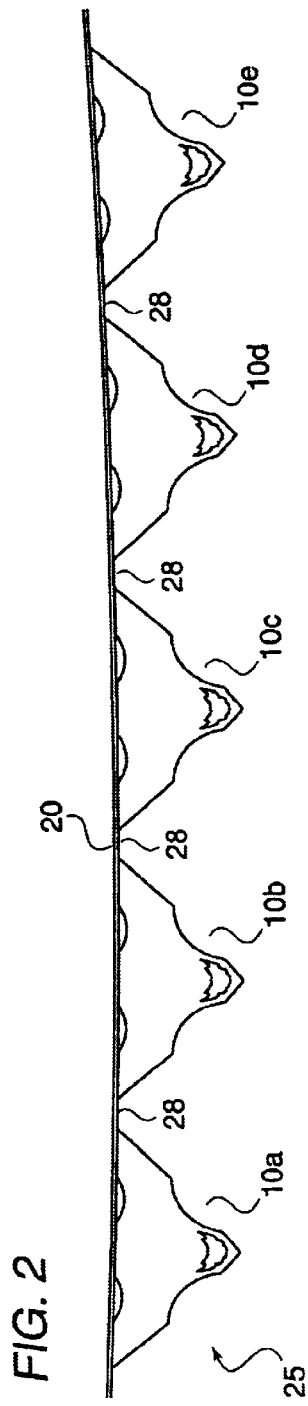
FIG. 1
FIG. 2

US 6,640,483 B2

LIGHTWEIGHT BIRD DECOY APPARATUS

CROSS-REFERENCE TO RELATED APPLICATIONS

This application is a continuation of Ser. No. 29/138,206, filed Jan. 2, 2001, and claims benefit under 35 U.S.C. 119(e) of provisional application No. 60/263,451, filed Jan. 24, 2001, which are incorporated herein by reference.

FIELD OF THE INVENTION

The present invention relates to a bird decoy apparatus, and in particular to a lightweight apparatus used for simulating the behavior of birds in flight.

BACKGROUND INFORMATION

Decoys shaped to resemble birds have been used to attract birds to a location for hunting and viewing purposes. Prior uses of such decoys have come in a variety of forms. In some arrangements, bird decoys are placed in a stationary position on the ground or in water, and in others, a plurality of decoys are grouped together and suspended by various means above the ground, simulating a flock of birds in flight.

In one such arrangement of the latter type described in U.S. Pat. No. 1,629,442, a group of three-dimensional wire frame bird decoys is suspended on parallel wires and positioned one bird behind the other in a head-follows-tail fashion. In another arrangement presented in U.S. Pat. No. 6,044,581, several balloon-like, three-dimensional bird decoys are tethered to a string in a manner that allows a degree of flexibility in the formation of the flock, and the orientation of the individual birds.

These and similar bird decoy arrangements can often be cumbersome to carry to the hunting/viewing site because of the size and weight of the decoys themselves in addition to whatever supporting equipment they require, and time-consuming to construct on-site due to the relative complexity of their assembly. For the same reasons, it can be difficult to modify the configurations of these arrangements to adjust to weather and other on-site conditions.

It is found that a need exists for a portable, lightweight bird decoy apparatus that is relatively easy and convenient to use and yet remains attractive to birds.

SUMMARY OF THE INVENTION

It is therefore an object of the present invention to provide such a portable, lightweight bird decoy apparatus that simulates the appearance of birds in flight.

The present invention provides a bird decoy apparatus that includes a plurality of flat decoy panels, each panel being shaped to simulate an appearance of a bird. Each of the plurality of decoy panels are attached to a suspension line.

In particular, the present invention provides a bird decoy apparatus in which a plurality of bird decoys, which comprise individual, flat bird-like panels, are arranged in tandem, or generally wing to wing, on a linear suspension element. A leading edge of each decoy is fixed to the linear suspension element, leaving a posterior section of the decoy, designed to represent a tail section of a bird, free to move in response to wind or mechanical manipulation.

Each flat decoy panel in the apparatus is substantially triangular in shape, and includes cut-away sections which serve to accelerate air flow over the decoy panel to enhance movement and better simulate the motion of individual birds in a flock.

The tandem decoy apparatus can be configured in various forms by fixing end or middle sections of the apparatus to supporting elements such as poles. In one such configuration, a middle section of the apparatus may be supported in a position that is forward or backward relative to the ends, creating a V-shaped arrangement, which is a flock pattern commonly observed in wildlife.

BRIEF DESCRIPTION OF THE DRAWINGS

FIG. 1 is a plan view of an individual bird decoy panel according to an embodiment of the present invention.

FIG. 2 is a plan view of the bird decoy apparatus according to an embodiment of the present invention arranged for purposes of illustration in a straight horizontal configuration.

DETAILED DESCRIPTION

Figure 3B:
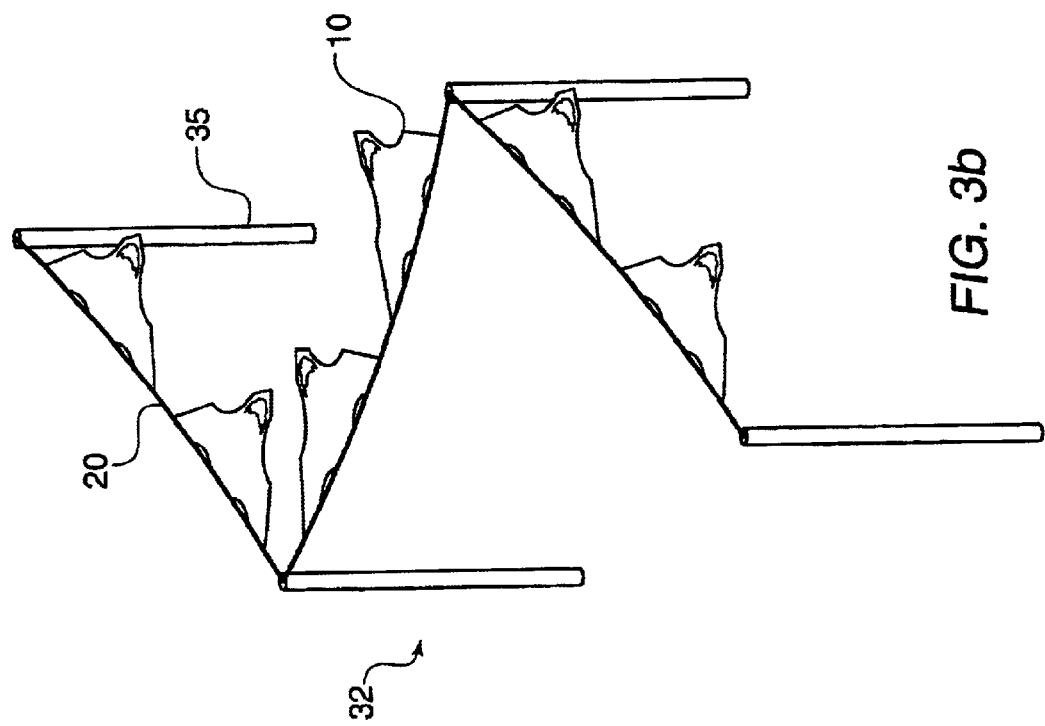
FIG. 3B illustrates a second exemplary on-site configuration of the bird decoy apparatus according to the present invention.

As shown in FIG. 1, decoy panel 10 is substantially triangular in shape, and is imprinted, on both a top and bottom face, with various designs to simulate the appearance of a bird in flight. In this regard, the decoy panel 10 includes two wing sections 18a, 18b, and posterior section 16, which is imprinted with a design to appear as a tail of a bird. To better simulate the appearance of a bird, and to improve the aerodynamic properties of the panel, sections 12a, 12b, 12c, and 12d are cut-out of the sides of the panel. The cut-out sections may be semi-circular in shape, as shown, or may also correspond to other shapes, such as triangular, in various other implementations.

The side of decoy panel 10 opposite the posterior section 16 is called the leading edge 15 of the panel. In a given embodiment, the width of the leading edge 15 can range from as little as 12 inches to as much as 70 inches, depending on the type and size of the bird being simulated. In one particular embodiment, the decoy panel 10 is designed to simulate the appearance of a Canada Goose. It is found that for this particular embodiment, that the optimal range of widths for the leading edge 15 of the panel 10 is between 30 and 60 inches. The length of the decoy panel 10, which is measured from the leading edge 15 to the tip of the posterior section 16, can range from as little as 6 inches to as high as 36 inches, with an optimal range of between 18 and 24 inches. It is noted that the width and length of the decoy panel 10 are maintained in proportion in order to realistically simulate the appearance of a bird in flight.

The decoy panel 10 is flat, having a thickness in a range of approximately 1/100th of a millimeter to approximately one inch. Because the decoy panel 10 is flat, it is also lightweight, enhancing its portability, ease-of-use, and aerodynamic properties. To further improve these benefits, the decoy panel 10 is made from a lightweight and flexible or semi-flexible material such as, for example, polyethylene film, rayon or olefin. For decoy panel implementations having a thickness of approximately one inch, foam fillers can be used between thin layers of polymeric film. Due to the lightness and flexibility of its material, the decoy panel 10 flutters in a wave pattern when subjected to winds or mechanical manipulation.

FIG. 2 shows an embodiment of the bird decoy apparatus 25 according to the present invention. As shown in the figure, several individual bird decoy panels 10*a*, 10*b*, 10*c*, 10*d*, and 10*e*, as described in FIG. 1, are fixed to a suspension line 20 along their respective leading edges 15. The suspension line 20 can, for example, be a lightweight string, cord, wire, rope, chain or any other suitable suspension structure, and may be either rigid or flexible depending upon the implementation.

In various embodiments, the apparatus 25 can include any amount of individual decoy panels, depending on the bird that is to be simulated. For example, in one implementation, the apparatus 25 may include between 2 and 24 individual decoy panels 10. In FIG. 2, five decoy panels 10*a*, 10*b* . . . 10*e* are shown. The individual decoy panels 10 are arranged in 'tandem' on the suspension line 20. The term 'tandem', as used in the present invention, means that the decoy panels 10*a*, 10*b* . . . 10*e* are arranged with their wings adjacent to one another in a wing-to-wing deployment. For example, the right wing of decoy panel 10*b* is adjacent to the left wing of decoy panel 10*c*. Although the decoy panels 10*a*, 10*b* . . . 10*e* are adjacent to one another, they do not necessarily come in contact because of spaces 28 which can be used to separate the decoys. In various embodiments of the decoy apparatus 25, spacings between 0 (in which case the decoy panels contact each other) and 36 inches may be used. The various spaces 28 are adjusted to realistically simulate the actual spacing of birds in a flock during flight, and again may depend on the type and size of the birds being simulated.

The decoy apparatus 25 can be packaged in a compact and portable arrangement since the decoy panels 10 are flexible and can be folded and the suspension line 20 can be wrapped around the folded decoy panels. For example, the decoy apparatus 25 may be wrapped around a lightweight cardboard cylinder, thus allowing ease of transport to and deployment at the desired hunting/viewing site.

Figure 3A:
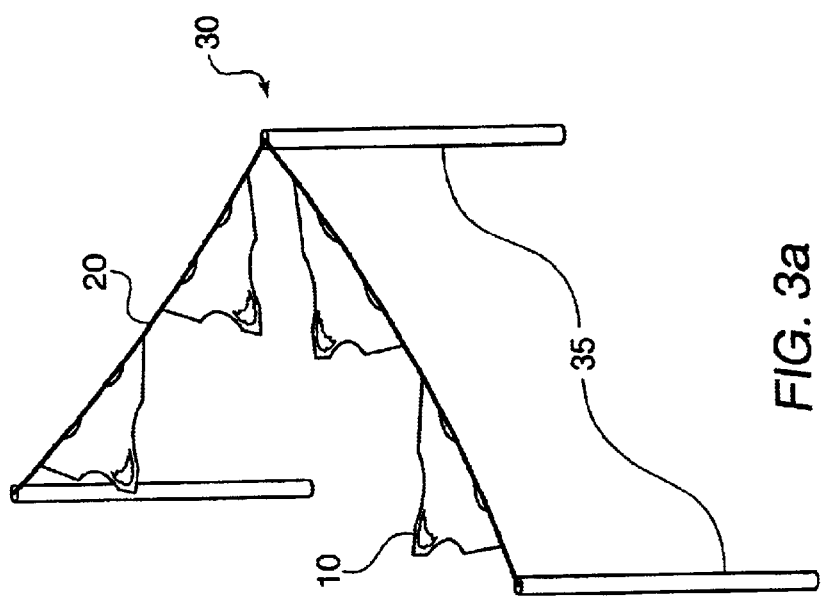
FIG. 3A illustrates a first exemplary on-site configuration of the bird decoy apparatus according to the present invention.

In FIG. 3A, a first exemplary configuration 30 for using the decoy apparatus 25 to attract birds is shown. In the first configuration 30, the apparatus 25 is fixed to supports 35, which may be for example poles, or naturally occurring supports such as trees, and suspended therefrom. The first configuration 30 includes three supports 35, one of which is positioned between the other two supports in a first direction and forward or backward relative to the other two supports in a second direction, and pulls the middle of the decoy apparatus 25 forward or backward in the second direction in a V-shaped pattern. As indicated above, when the decoy apparatus is suspended in such a configuration, the individual decoy panels are free to move in response to winds or to mechanical manipulation of the suspension line 20. The combination of individual decoy movement and a V-shaped flock pattern is particularly attractive to birds.

A second configuration 32 is shown in FIG. 3B. In this second configuration 32, four supports are used to suspend the decoy apparatus 25, creating a zig-zag pattern instead of a V-shape. As the exemplary configurations demonstrate, the decoy apparatus 25 can be set up in any number of arrangements and configurations, limited only by the physical dimensions of the decoy apparatus 25.

In the foregoing description, the apparatus and system of the present invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. For example, although in the illustrated embodiments, the individual decoy panels are attached to the suspension line along their respective leading edges, other arrangements for attaching the decoy panels to the suspension line are contemplated. The specification and the drawings are accordingly to be regarded in an illustrative rather than in a restrictive sense.

What is claimed is:

1. A bird decoy, comprising:
    a flat panel structure substantially triangular in shape simulating an appearance of a particular type of bird, the structure including:
    a leading edge; and
    two trailing edges leading from the leading edge toward a tail section, each trailing edge having a semicircular cut-out portion having a convex portion directed inwardly and situated toward the tail section, each of the cut-out portions having a length of over one-third a total length of each of the trailing edges, the leading edge having two semi-circular cut-outs directed inwardly and situated such that the leading edge is separated into three approximately equal straight sections.

* * * * *